(12) United States Patent
Matsumura et al.

(10) Patent No.: US 12,447,726 B2
(45) Date of Patent: Oct. 21, 2025

(54) CAVITY-CONTAINING POLYESTER FILM

(71) Applicant: TOYOBO CO., LTD., Osaka (JP)

(72) Inventors: Mei Matsumura, Tsuruga (JP); Shotaro Nishio, Tsuruga (JP); Akira Shimizu, Tsuruga (JP)

(73) Assignee: TOYOBO CO., LTD., Osaka (JP)

( * ) Notice: Subject to any disclaimer, the term of this patent is extended or adjusted under 35 U.S.C. 154(b) by 152 days.

(21) Appl. No.: 18/020,533

(22) PCT Filed: Sep. 8, 2021

(86) PCT No.: PCT/JP2021/033057
§ 371 (c)(1),
(2) Date: Feb. 9, 2023

(87) PCT Pub. No.: WO2022/059580
PCT Pub. Date: Mar. 24, 2022

(65) Prior Publication Data
US 2023/0295421 A1 Sep. 21, 2023

(30) Foreign Application Priority Data
Sep. 15, 2020 (JP) ................. 2020-154520

(51) Int. Cl.
*B32B 27/36* (2006.01)
*B32B 27/08* (2006.01)
(Continued)

(52) U.S. Cl.
CPC .............. *B32B 27/36* (2013.01); *B32B 27/08* (2013.01); *B32B 27/205* (2013.01); *C08K 3/22* (2013.01);
(Continued)

(58) Field of Classification Search
None
See application file for complete search history.

(56) References Cited

U.S. PATENT DOCUMENTS

| 3,944,699 | A |   | 3/1976 | Mathews et al. |
| 6,051,311 | A | * | 4/2000 | Osaka ................. G09F 3/02 428/40.1 |

(Continued)

FOREIGN PATENT DOCUMENTS

| CN | 108884255 A | 11/2018 |
| CN | 110325363 A | 10/2019 |

(Continued)

OTHER PUBLICATIONS

Yoshino, K., Void Containing Polyester Resin Film, Jan. 23, 2020, machine translation of JP2020-011494 (Year: 2020).*

(Continued)

*Primary Examiner* — Chinessa T. Golden
(74) *Attorney, Agent, or Firm* — WHDA, LLP

(57) ABSTRACT

[Problem] To provide a cavity-containing polyester film which exhibits excellent concealability, degree of whiteness and printability, and which is still free from the occurrence of a wrinkle, distortion and the like in cases where, for example, the cavity-containing polyester film is used for a roll label, and a label is delivered therefrom or wound around a product.

[Solution] A cavity-containing polyester film which comprises a layer A that internally contains a cavity, and layers B that are arranged on both surfaces of the layer A, wherein: the layer A is formed of a composition A that contains a polyester resin A and a polypropylene resin; the layers B are formed of a composition B that contains inorganic particles and a polyester resin B; and the amount of self-weight deflection of the film is from 60 mm to 100 mm at least in one direction.

9 Claims, 1 Drawing Sheet

(51) Int. Cl.
- *B32B 27/20* (2006.01)
- *C08K 3/22* (2006.01)
- *C08L 67/02* (2006.01)
- *C09J 7/29* (2018.01)
- *G09F 3/02* (2006.01)

(52) U.S. Cl.
CPC ............... *C08L 67/02* (2013.01); *C09J 7/29* (2018.01); *G09F 3/02* (2013.01); *B32B 2250/03* (2013.01); *B32B 2250/244* (2013.01); *B32B 2250/40* (2013.01); *B32B 2264/1022* (2020.08); *B32B 2264/303* (2020.08); *B32B 2272/00* (2013.01); *B32B 2307/4023* (2013.01); *B32B 2307/54* (2013.01); *B32B 2307/72* (2013.01); *B32B 2519/00* (2013.01); *C08K 2003/2237* (2013.01); *G09F 2003/0229* (2013.01); *G09F 2003/0257* (2013.01)

(56) References Cited

U.S. PATENT DOCUMENTS

| | | | |
|---|---|---|---|
| 2018/0194097 | A1 | 7/2018 | Deguchi et al. |
| 2019/0084206 | A1 | 3/2019 | Deguchi et al. |
| 2019/0241736 | A1* | 8/2019 | Endtner ............ B29B 9/02 |
| 2019/0381774 | A1 | 12/2019 | Kimura et al. |
| 2021/0024708 | A1 | 1/2021 | Ishimaru et al. |

FOREIGN PATENT DOCUMENTS

| | | | |
|---|---|---|---|
| JP | 49-134755 | A | 12/1974 |
| JP | 54-29550 | B1 | 9/1979 |
| JP | 2-180933 | A | 7/1990 |
| JP | 2-284929 | A | 11/1990 |
| JP | 5-194773 | A | 8/1993 |
| JP | 11-116716 | A | 4/1999 |
| JP | 2002-52674 | A | 2/2002 |
| JP | 2020-11494 | A | 1/2020 |
| JP | 2020011494 | A * | 1/2020 |
| KR | 2018-0132666 | A | 12/2018 |
| TW | 200609297 | A | 3/2006 |
| TW | 201621013 | A | 6/2016 |
| TW | 201945428 | A | 12/2019 |
| WO | 2017/010306 | A1 | 1/2017 |
| WO | 2017/170002 | A1 | 10/2017 |
| WO | 2018/159811 | A1 | 9/2018 |
| WO | 2022/176744 | A1 | 8/2022 |

OTHER PUBLICATIONS

Office Action dated Mar. 28, 2024, issued in counterpart TW Application No. 110134301, with English translation. (22 pages).
International Preliminary Report on Patentability (Form PCT/IB/373) issued in counterpart International Application No. PCT/JP2021/033057 dated Mar. 21, 2023, with Form PCT/ISA/237. (5 pages).
1st Office Action dated May 3, 2022, issued in counterpart oTW Patent Application No. 110134301, with English Translation (11 pages).
Rejection Decision dated Nov. 7, 2022, issued in counterpart TW Patent Application No. 110134301, with English Translation (7 pages).
Extended European Search Report dated Jan. 30, 2024, issued in counterpart EP Application No. 21869267.1 (8 pages).
International Search Report dated Nov. 22, 2021, issued in counterpart International Application No. PCT/JP2021/033057. (2 pages).
1st Office Action dated May 3, 2022, issued in counterpart TW Patent Application No. 11120436180, with English Translation (11 pages).
Rejection Decision dated Nov. 7, 2022, issued in counterpart TW Patent Application No. 11121100170, with English Translation (7 pages).
Office Action dated Jan. 9, 2025, issued in counterpart KR Application No. 10-2023-7010149, with English translation. (11 pages).

* cited by examiner

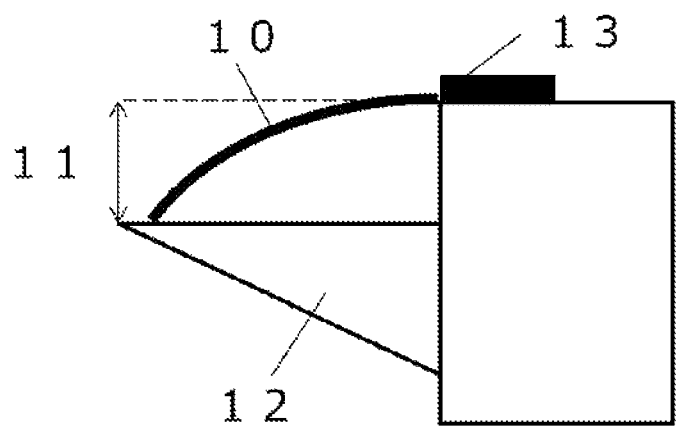

CAVITY-CONTAINING POLYESTER FILM

TECHNICAL FIELD

The present invention relates to a cavity-containing polyester film.

BACKGROUND ART

Synthetic paper, a paper substitute of which the main component is synthetic resin, is superior to natural paper in terms of water resistance, moisture absorption dimensional stability, and surface stability, and is widely used for labels and stickers, posters, recording paper, packaging materials, and the like. Polyethylene-based resins, polypropylene-based resins, polyester-based resins, and the like are used as main raw materials for synthetic paper. In particular, polyester-based resins typified by polyethylene terephthalate have been spread in a wide range of applications because of their excellent mechanical properties, thermal properties, and the like.

Examples of a method for obtaining a film having functions similar to those of paper generally include a method in which a large amount of fine cavities is contained inside the film, and a method in which a flat film is roughened by performing surface treatments such as sandblasting, chemical etching, and matting. Among these methods, the former method in which a large amount of fine cavities is contained inside the film is widely employed since the method has advantages such as reduction in the cost per unit area since not only paper-like concealability and degree of whiteness are attained but also the weight of the film itself can be saved and excellent image clarity during printing since moderate flexibility and cushioning properties are attained.

Examples of a method for creating fine cavities inside the film generally include a method in which a melt having a sea-island structure is first obtained by mixing an immiscible thermoplastic resin (hereinafter referred to as an immiscible resin) into a polyester-based resin and dispersing the immiscible resin in the polyester-based resin. Then, cavities are created by interfacial peeling between the polyester-based resin and immiscible resin by forming an undrawn sheet by extrusion from a die and drawing the undrawn sheet in at least one axial direction. As the kinds of immiscible resins as an island component with respect to polyester-based resins as a sea component, polyolefin-based resins such as polyethylene-based resins, polypropylene-based resins, and polymethylpentene-based resins (see Patent Documents 1 to 3, for example) and polystyrene-based resins (see Patent Documents 4 and 5, for example) are preferably utilized. Among these resins, polypropylene-based resins are particularly preferable from the viewpoint of cavity creation properties and cost performance.

PRIOR ART DOCUMENT

Patent Documents

Patent Document 1: JP-A-49-134755
Patent Document 2: JP-A-2-284929
Patent Document 3: JP-A-2-180933
Patent Document 4: JP-A-54-29550
Patent Document 5: JP-A-11-116716

SUMMARY OF THE INVENTION

Problems to be Solved by the Invention

For example, in the case of using conventional polyester-based synthetic paper as a roll label, there is a concern that the appearance as a label is impaired when the rigidity is not sufficient. For example, problems arise in that the label wrinkles when sent out and the label is greatly affected by the unevenness of the product when wound around the product, leading to denting and distortion. On the other hand, in a case where the rigidity is too high, the stress applied to the bonding portion increases when the label is wound around the product, and the bonding may easily come off.

In recent years, it is required to reduce the amount of plastic products used and to improve the recycling rate of plastic products from the viewpoint of preventing environmental destruction such as the generation of carbon dioxide due to incineration as much as possible.

An object of the present invention is to solve the above-mentioned problems in the prior art and to provide a cavity-containing polyester film, which exhibits excellent concealability, degree of whiteness, and printability, has less impact on the environment by use of a recycled raw material, and does not undergo wrinkling, distortion and the like when a label is sent out, when a label is wound around a product, and the like, for example, in the case of being used as a roll label.

Means for Solving the Problems

Here, as described above, for example, in the case of using a cavity-containing polyester film as a substrate for label, the stress applied to the bonding portion increases when the label is wound around the product and the bonding may easily come off when the rigidity is too high. When the rigidity is diminished, the label is likely to be greatly affected by the unevenness of the product and the appearance as a label tends to be impaired.

Meanwhile, when it is attempted to optimize the rigidity of conventional polyester-based synthetic paper, the concealability and the degree of whiteness tend to be insufficient. Furthermore, the film forming properties and the thermal dimensional stability tend to decrease.

For this reason, problems may arise in that the adhesion easily come off and wrinkling occurs when it is attempted to optimize the rigidity of conventional polyester-based synthetic paper. As described above, there is trade-off relationship at least between the aforementioned physical properties of polyester-based synthetic paper, and there is a demand for a cavity-containing polyester film, which exhibits these physical properties in a well-balanced manner.

As a result of intensive studies, the inventors of the present invention have succeeded in solving all of the aforementioned trade-off problems by controlling the kind of resin, apparent density, thickness, and elastic modulus in the deflection direction in a cavity-containing polyester film and regulating the amount of self-weight deflection to be in a specific range. The inventors have found out that a cavity-containing polyester film is thus obtained which does not undergo wrinkling, distortion and the like when a label is sent out, when a label is wound, and the like while maintaining the concealability and degree of whiteness.

In other words, the cavity-containing polyester film of the present invention has the following configuration.

1. A cavity-containing polyester film having a layer A containing cavities inside and a layer B disposed on both surfaces of the layer A, in which the layer A is formed of a composition A containing a polyester-based resin A and a polypropylene-based resin, the layer B is formed of a composition B containing inorganic particles and a polyester-based resin B, and an amount of self-weight deflection of the film in at least one direction is 60 mm or more and 115 mm or less.
2. In an aspect, at least one of the polyester-based resin A or the polyester-based resin B contains a recycled bottle raw material.
3. In an aspect, the composition A contains a recycled raw material of a cavity-containing polyester film at 5% to 60% by weight.
4. In an aspect, the inorganic particles in the composition B are titanium oxide.
5. In an aspect, the cavity-containing polyester film has an optical density of 0.55 or more in terms of 50 μm thickness and a color tone b value of 4 or less.
6. In an aspect, the cavity-containing polyester film has an apparent density of 0.8 g/cm$^3$ or more and 1.3 g/cm$^3$ or less.
7. In an aspect, a substrate for label including the cavity-containing polyester film described above.
8. In an aspect, a film for label including an ink close adhesion coat on at least one surface of the film described above.
9. In an aspect, a roll label including a pressure sensitive adhesive layer on a part of at least one surface of the film for label.

Effect of the Invention

According to the present invention, there is provided a cavity-containing polyester film, which exhibits excellent concealability, whiteness, and printability and is highly rigid. Furthermore, in the present invention, wrinkling, distortion and the like are less likely to occur.

BRIEF DESCRIPTION OF THE DRAWINGS

FIG. 1 is a schematic diagram illustrating a method for measuring the amount of self-weight deflection.

MODE FOR CARRYING OUT THE INVENTION

Hereinafter, the present invention will be described in detail.

According to the present invention, it is possible to obtain a cavity-containing polyester film, which is lightweight and exhibits excellent film forming properties and thermal dimensional stability.

The cavity-containing polyester film can provide synthetic paper that can be used for applications including labels, and these are less likely to undergo wrinkling, distortion and the like in a case of being used as roll labels as well.

The cavity-containing polyester film of the present invention has a layer A containing cavities inside and a layer B disposed on both surfaces of the layer A, the layer A is formed of a composition A containing a polyester-based resin A and a polypropylene-based resin, and the layer B is formed of a composition B containing inorganic particles and a polyester-based resin B.

The polyester resins to be the main components of the layer A formed of the composition A and the layer B formed of the composition B (hereinafter simply referred to as polyester-based resins) are preferably polymers synthesized from dicarboxylic acids or ester-forming derivatives thereof and diols or ester-forming derivatives thereof.

Representative examples of such polyester-based resins include polyethylene terephthalate, polybutylene terephthalate, and polyethylene-2,6-naphthalate, and polyethylene terephthalate is preferable from the viewpoint of mechanical properties, heat resistance, cost and the like.

In the present invention, the polyester-based resin A contained in the composition A and the polyester-based resin B contained in the composition B may be the same kind of resin or different kinds of resin. Even if the polyester-based resins A and B are the same kind of resin, the polyester-based resins A and B may have different molecular weights.

Other components may be copolymerized with these polyester-based resins as long as the object of the present invention is not impaired. Specifically, as the copolymerization components, examples of the dicarboxylic acid component include isophthalic acid, naphthalenedicarboxylic acid, 4,4-biphenyldicarboxylic acid, adipic acid, sebacic acid, and any ester-forming derivative thereof. Examples of the diol component include diethylene glycol, hexamethylene glycol, neopentyl glycol, and cyclohexanedimethanol. Examples of the diol component also include polyoxyalkylene glycols such as polyethylene glycol and polypropylene glycol. The amount of copolymerization is preferably 10 mol % or less, more preferably 5 mol % or less per constituent repeating unit.

Examples of the method for producing the polyester-based resin of the present invention include a method in which an esterification or transesterification reaction is first conducted according to a conventional method using the above-mentioned dicarboxylic acid or an ester-forming derivative thereof and the above-mentioned diol or an ester-forming derivative thereof as main starting materials and then a polycondensation reaction is further conducted at a high temperature and a reduced pressure.

The limiting viscosity of the polyester-based resin of the present invention is preferably in a range of 0.50 to 0.9 dl/g, more preferably in a range of 0.55 to 0.85 dl/g from the viewpoint of film forming properties and recycling properties. The limiting viscosity can be measured using pellets of the polyester-based resin.

The melt viscosity of the polyester-based resin of the present invention at a melting temperature of 280° C. and a shearing velocity of 121.6 sec$^{-1}$ is 90 Pa·s or more and 400 Pa·s or less, more preferably 130 Pa·s or more and 350 Pa·s or less. As the melt viscosity is within such a range, it is possible to obtain a cavity-containing polyester film, which exhibits excellent concealability, whiteness, and printability and is highly rigid. Furthermore, it is possible to obtain a cavity-containing polyester film, which is less likely to undergo wrinkling, distortion and the like, is lightweight, and exhibits excellent film forming properties and thermal dimensional stability.

Next, the immiscible resin used in the present invention will be described. As the thermoplastic resin that is immiscible with the polyester-based resin used in the present invention, a polyolefin-based resin can be exemplified, and for example, a polypropylene-based resin is preferable. The polypropylene-based resin is uniformly mixed in the polyester-based resin in a dispersed state, and peels off at the interface with the base resin during drawing to become a source of cavity formation.

The preferable amount of the immiscible resin, for example, a polypropylene-based resin blended varies depending on the amount of cavity formation required for the film to be finally obtained, drawing conditions, and the like. Usually, the blended amount is selected from a range of 3% by mass or more and less than 40% by mass, more preferably 5% by mass or more and 30% by mass with respect to 100% by mass of the composition A.

The fact that the amount of the immiscible resin blended is within such a range contributes to bringing the amount of self-weight deflection into the predetermined range according to the present invention. Meanwhile, in the present invention, when the amount of the immiscible resin blended is less than 3% by mass, the amount of cavities generated in the drawing step is insufficient and it is difficult to obtain satisfactory lightness, flexibility, painting properties, writability, and the like. On the other hand, it is not preferable that the amount of the immiscible resin blended is 40% by mass or more since the drawing properties remarkably decrease as the blended amount increases as well as the heat resistance, strength, and rigidity may be impaired.

These polyester-based resins or polypropylene-based resins may contain a small amount of other polymers and antioxidants, heat stabilizers, matting agents, pigments, ultraviolet absorbers, fluorescent whitening agents, plasticizers, other additives or the like as long as the effects of the present invention are not impaired. In particular, it is preferable to contain an antioxidant or a heat stabilizer in order to suppress oxidative deterioration of the polypropylene-based resin. The kinds of antioxidant and heat stabilizer are not particularly limited, but include, for example, hindered phenol-based, phosphorus-based, hindered amine-based ones, and these may be used singly or in combination. The added amount is preferably in a range of 1 to 50,000 ppm with respect to the entire amount of the composition A.

In the present invention, in order to improve the concealability and degree of whiteness of the cavity-containing polyester film, it is possible to contain inorganic particles in the composition A forming the layer A, if necessary. It is possible to contain inorganic particles, if necessary. Examples of the inorganic particles include silica, kaolinite, talc, calcium carbonate, zeolite, alumina, barium sulfate, titanium oxide, and zinc sulfide. Titanium oxide, calcium carbonate, and barium sulfate are preferable from the viewpoint of concealability and degree of whiteness. These inorganic particles may be used singly or in combination of two or more kinds thereof. These particles can be contained in the film by being added to the polyester-based resin or the immiscible resin in advance.

In the present invention, the method for mixing the inorganic particles with the composition A, for example, the method for mixing the inorganic particles with the polyester-based resin or the immiscible resin is not particularly limited. Examples thereof include a method in which the polyester-based resin and the immiscible resin are dry-blended and then the mixture is put into the film forming machine as it is, and a method in which the polyester-based resin and the immiscible resin are dry-blended and then melt-kneaded using various general kneaders to form a masterbatch.

The cavity-containing polyester film of the present invention has a layer A containing cavities inside and a layer B disposed on both surfaces of the layer A as a layer configuration. By having such a configuration, it is possible to prevent the layer A containing the immiscible resin from being exposed to the surface, suppress exposure of the particles of the immiscible resin, and prevent process contamination such as roll contamination from occurring. When the layer A contains a recovered raw material as well, there is an effect of preventing a decrease in the degree of whiteness by covering the layer A with the layer B containing an inorganic pigment.

In the present invention, as the recovered raw material, scraps that are cut after the film has been drawn, and the like can be used as described later.

The proportion of the sum of the thicknesses of the layers B laminated on both surfaces of the layer A is preferably in a range of 1% to 40%, more preferably 5% to 30% with respect to the thickness of the entire film from the viewpoint of cavity creating properties and suppression of exposure of immiscible resin. The fact that the sum of the thicknesses of the layers B is within such a range contributes to bringing the amount of self-weight deflection into the predetermined range according to the present invention. Meanwhile, it is not preferable that the sum of the thicknesses of the layers B is less than 1% since exposure of the immiscible resin cannot be suppressed. On the other hand, in a case where the sum of the thicknesses of the layers B is more than 40%, it is difficult to form cavities for obtaining sufficient lightness and cushioning properties.

In the present invention, the sum of the thicknesses of the layers B is only required to be within the above range, and the thickness of the layer B disposed on one surface of the layer A may be different from the thickness of the layer B disposed on the other surface.

The composition B forming the layer B contains inorganic particles. In the present invention, examples of the inorganic particles contained in the layer B include silica, kaolinite, talc, calcium carbonate, zeolite, alumina, barium sulfate, titanium oxide, and zinc sulfide. From the viewpoint of concealability and degree of whiteness, titanium oxide, calcium carbonate and barium sulfate are preferable and titanium oxide is particularly preferable. These inorganic particles may be used singly or in combination of two or more kinds thereof. These particles can be contained in the film by being added to the polyester-based resin in advance.

The average particle size of the inorganic particles contained in the layer B is preferably 5.0 μm or less, more preferably 3.0 μm or less, particularly preferably 2.5 μm or less from the point of print quality when a print layer and the like are provided in post-processing. The average particle size of the inorganic particles is preferably 0.1 μm or more, particularly preferably 0.2 μm or more from the point of slipperiness and concealability in the film forming step and post-processing step.

The amount of the inorganic particles added in the layer B is preferably 5% to 40% by mass, more preferably 7% to 30% by mass with respect to 100% by mass of the composition B forming the layer B.

It is not preferable that the added amount is less than 5% by mass since it is difficult to improve the concealability and degree of whiteness. Conversely, it is not preferable that the added amount is more than 40% by weight since the film forming properties and the mechanical strength of the film deteriorate remarkably as the amount of the inorganic particles blended increases.

The content percentage of the inorganic particles in the layer B is in a range of preferably 1% to 30% by mass, more preferably 2% to 20% by mass with respect to the entire film. It is not preferable that the added amount is less than 1% by mass since it is difficult to improve the concealability and degree of whiteness. Conversely, it is not preferable that the added amount is more than 30% by mass since the film forming properties and the mechanical strength of the film deteriorate remarkably.

A coating layer may be provided on at least one surface of the cavity-containing polyester film of the present invention in order to improve the covering properties and/or adhesive properties of printing inks, coating agents, and/or the like. A polyester-based resin is preferable as the compound constituting the coating layer. In addition to this, it is possible to apply compounds disclosed as a means (easily adhesive layer) for improving the adhesive properties of ordinary polyester-based films such as a polyurethane-based resin, a polyester urethane-based resin, an acrylic resin, and a polyether-based resin. A crosslinked structure may be formed in order to improve the close adhesion durability of these easily adhesive layers. By containing a crosslinking agent, it is possible to further improve close adhesive properties at a high temperature and a high humidity. Specific examples of the crosslinking agent include urea-based, epoxy-based, melamine-based, isocyanate-based, oxazoline-based, and carbodiimide-based crosslinking agents. In order to promote a crosslinking reaction, a catalyst and the like may be appropriately used, if necessary.

The coating layer may contain lubricant particles in order to impart slipperiness, mattness, ink absorbing properties to the surface. The particles may be inorganic particles or organic particles, and are not particularly limited. Examples thereof include (1) inorganic particles such as silica, kaolinite, talc, light calcium carbonate, heavy calcium carbonate, zeolite, alumina, barium sulfate, carbon black, zinc oxide, zinc sulfate, zinc carbonate, zirconium oxide, titanium dioxide, aluminum silicate, diatomaceous earth, calcium silicate, aluminum hydroxide, calcium carbonate, magnesium carbonate, calcium phosphate, magnesium hydroxide, and barium sulfate, and (2) organic particles such as acrylic or methacrylic, vinyl chloride-based, vinyl acetate-based, nylon, styrene/acrylic, styrene/butadiene-based, polystyrene/acrylic, polystyrene/isoprene-based, polystyrene/isoprene-based, methyl methacrylate/butyl methacrylate-based, melamine-based, polycarbonate-based, urea-based, epoxy-based, urethane-based, phenol-based, diallyl phthalate-based, and polyester-based particles. Silica is particularly preferably used in order to impart moderate slipperiness to the coating layer.

As a method for providing the coating layer, it is possible to apply a commonly used method such as gravure coating, kiss coating, dip coating, spray coating, curtain coating, air knife coating, blade coating, or reverse roll coating. As the coating step, it is possible to apply any of a method in which coating is performed before drawing of the film, a method in which coating is performed after longitudinal drawing, or a method in which coating is performed on the surface of the film subjected to the drawing treatment.

Both of the polyester-based resin A and the polyester-based resin B in the present invention may contain recycled raw materials such as recycled bottle raw materials.

From the viewpoint of efforts to protect and preserve the environment, recycled raw materials are preferably contained at 20% or more or 30% or more with respect to the polyester-based resins in the entire film.

For example, in a case where the raw material for the cavity-containing polyester layer A contains a recycled bottle raw material, such as recycled polyester, the amount of recycled polyester contained in the composition A may be 5% by mass or more, is, for example, 50% by mass or more, and may be 60% by mass or more or 70% by mass or more with respect to 100% by mass of the solid components in the composition A.

For example, in a case where the raw material for the cavity-containing polyester layer B contains a recycled bottle raw material, such as recycled polyester, the amount of recycled polyester contained in the composition B may be 5% by mass or more, is, for example, 50% by mass or more, and may be 60% by mass or more or 70% by mass or more with respect to 100% by mass of the solid components in the composition B.

In an aspect, the amount of the recycled bottle raw material, such as recycled polyester contained in 100% by mass of the solid components in the composition B is larger than the amount of the recycled bottle raw material, such as recycled polyester contained in 100% by mass of the solid components in the composition A.

In the cavity-containing polyester film of the present invention, it is possible to use a self-regenerated raw materials, which consist of scraps generated in the film forming step and waste film generated by breakage troubles and the like, in the layer A. The amount of such recycled raw materials (self-regenerated raw materials) of the cavity-containing polyester film added is preferably 5% to 60% by weight with respect to the total amount of the respective compositions in the composition A forming the layer A from the viewpoint of raw material cost reduction, degree of whiteness, and film forming properties. Self-regenerated raw materials may be contained in the layer B.

Next, the method for forming the cavity-containing polyester film in the present invention will be described, but the method is not particularly limited to this. For example, a mixture containing the above-described compositions is dried by a conventional method, then melt-extruded into a sheet from a T-shaped die, closely attached to a casting drum by an electrostatic application method or the like, cooled and solidified to obtain an undrawn film. Next, the undrawn film is drawn and oriented, but the most commonly used sequential biaxial drawing method, particularly a method in which an undrawn film is longitudinally drawn in the longitudinal direction and then transversely drawn in the width direction, will be described below as an example. First, in the longitudinal drawing step in the longitudinal direction, the film is heated and drawn by 1.0 to 5.0 times between two or multiple rolls having different circumferential speeds. As the heating means at this time, a method using a heating roll or a method using a non-contact heating medium may be used, or these may be used concurrently, but the temperature of the film is preferably set to be in a range of (Tg−10° C.) to (Tg+50° C.)

Next, the uniaxially drawn film is introduced into a tenter and drawn by 1.0 to 6.0 times in the width direction at a temperature of (Tg−10° C.) to (Tm−10° C.) to obtain a biaxially drawn film. Here, Tg is the glass transition temperature of a polyester-based resin, and Tm is the melting point of polyester. The film thus obtained is preferably subjected to heat treatment if necessary, and the treatment temperature is preferably in a range of (Tm−60° C.) to Tm.

In the present invention, as will be described later, the amount of self-weight deflection regulated in the present invention can be achieved by various factors such as the composition of the resins and the like constituting each layer, film thickness, and drawing conditions.

The cavity-containing polyester film in the present invention preferably has an optical density (OD value) of 0.55 or more, more preferably 0.6 or more.

In a case where the OD value is less than 0.55, sufficient concealability is not attained, the clearness of the image at the time of printing is inferior when the film is used for labels and the like, and the commercial value is impaired. The OD value is preferably 1.5 or less. It is not preferable that the OD value exceeds 1.5 from the viewpoint of cost since the degree of whiteness is saturated. The OD value is a value in terms of 50 μm thickness obtained by the measurement method described in the evaluation method described later.

The cavity-containing polyester film in the present invention preferably has a color tone b value of 4.0 or less, still more preferably 3.0 or less. In a case where the b value is greater than 4.0, the degree of whiteness is inferior, and the clearness at the time of printing is inferior when the film is formed into a label and the like, and the commercial value is impaired. The color tone b value is preferably −5.0 or more. In a case where the b value is smaller than −5.0, the film becomes bluisher, and the resolution is not satisfied in a well-balanced manner when the film is used as a printing substrate.

As a sample of the cavity-containing polyester film of the present invention having a length of 130 mm has a deflection due to its own weight of 60 mm or more and 115 mm or less, it is possible to achieve a film that can be used as a label without undergoing wrinkling, distortion and the like when the label is sent out and when the label is wound around a product, for example, in a case where the cavity-containing polyester film is used as a roll label.

As the self-weight deflection is 60 mm or more, it is possible to suppress the rigidity from becoming too large, suppress the stress applied to the bonding portion from becoming large when the label is wound around the product, and prevent the bonding from easily coming off. Meanwhile, as the self-weight deflection is 115 mm or less, sufficient rigidity can be exhibited, and in addition, excellent appearance, for example, as a label can be equipped. For example, it is possible to prevent the label from wrinkling when the label is sent out, the label can follow the unevenness of the product when wound around the product, and it is possible to prevent problems that lead to denting and distortion.

Self-weight deflection can be effectively adjusted by apparent density, thickness, and elastic modulus in the deflection direction.

In an aspect, the amount of self-weight deflection in a sample having a length of 130 mm is 61 mm or more and 114.5 mm or less, for example, 61.5 mm or more and 114 mm or less. As the self-weight deflection is within such a range, it is possible to more effectively suppress the rigidity from becoming too large, far effectively suppress the stress applied to the bonding portion from becoming large when the label is wound around the product, and prevent the bonding from easily coming off. Moreover, the film can have excellent appearance, for example, as a label. For example, it is possible to prevent the label from wrinkling when the label is sent out, the label can follow the unevenness of the product when wound around the product, and it is possible to prevent problems that lead to denting and distortion.

In the present invention, the amount of self-weight deflection is measured under the following conditions. As illustrated in FIG. 1, a sample 10 cut to 150 mm in the bending direction and 20 mm in width was prepared, and fixed with a magnet 13 so that the hanging length from the horizontal plane was 130 mm. A distance 11 in the vertical direction between the tip of the hanging portion of the film and the fixing portion of the film at that time is taken as the self-weight deflection. The distance 11 can be measured using an arbitrary measuring member 12.

The amount of self-weight deflection is measured at 25° C. and 50% humidity. The measurement can be performed by adjusting the thickness of the test piece to a range of 20 μm or more and 300 μm or less.

The thickness of the cavity-containing polyester film of the present invention is arbitrary, but is preferably 20 μm or more and 300 μm or less, for example, 40 μm or more and 140 μm or less, more preferably 40 μm or more and 120 μm or less. In an aspect, the thickness is 40 μm or more and 115 μm or less.

The thickness greatly affects the amount of self-weight deflection, and in the case of using the configuration and resin according to the present invention, it is possible to impart bending rigidity to the film and keep the amount of self-weight deflection small by setting the thickness to be in the above range. Furthermore, since the amount of self-weight deflection can be kept small, it is possible to prevent deterioration of the handleability as a label.

The elastic modulus of the cavity-containing polyester film in the present invention in the deflection direction also depends on the thickness of the film, but is preferably 2500 MPa or more, more preferably 3500 MPa or more. As the elastic modulus is 2500 MPa or more, it is possible to prevent the occurrence of wrinkling when the roll label is sent. According to the present invention, it is possible to adjust the film to have an appropriate amount of self-weight deflection by increasing the elastic modulus in a case where the thickness of the film cannot be increased as well. The elastic modulus can be effectively adjusted by draw ratios in the longitudinal direction and width direction, and heat treatment conditions.

The cavity-containing polyester film in the present invention has an apparent density of preferably 0.8 $g/cm^3$ or more and 1.3 $g/cm^3$ or less, more preferably 0.90 $g/cm^3$ or more and 1.2 $g/cm^3$ or less. When the apparent density is 0.8 $g/cm^3$ or more, it is possible to prevent a too large number of cavities from being created, and to prevent the handleability from deteriorating during post-processing such as printing and during use. In a case where the apparent density is 1.3 $g/cm^3$ or less, sufficient lightness and cushioning properties can be attained. From the viewpoint of affecting the amount of self-weight deflection as well, as the apparent density is 1.3 $g/cm^3$ or less, it is possible to prevent the self-weight from increasing in the case of having the same thickness as well, and prevent the amount of self-weight deflection from exceeding the range of the present invention. The apparent density is a value attained by the measurement method described in the evaluation method described later.

The film of the present invention may have an elastic modulus in the deflection direction of 2800 MPa or more and 6500 MPa or less.

As the elastic modulus in the deflection direction is within such a range, it is possible to more effectively suppress the rigidity from becoming too large, far effectively suppress the stress applied to the bonding portion from becoming large when the label is wound around the product, and prevent the bonding from easily coming off. Moreover, the film can have excellent appearance, for example, as a label. For example, it is possible to prevent the label from wrinkling when the label is sent out, the label can follow the unevenness of the product when wound around the product, and it is possible to prevent problems that lead to denting and distortion.

In the present invention, by controlling not only the kind of resin but also preferably the apparent density, thickness, and elastic modulus in the deflection direction, the amount of self-weight deflection can be more effectively regulated to be within the range of the present invention.

The "deflection direction" of the sample in the elastic modulus in the deflection direction is the same as the regulation in the above-described amount of self-weight deflection.

The elastic modulus in the deflection direction is preferably 2500 MPa or more and 7500 MPa or less, for example, 3500 MPa or more and 6500 MPa or less.

In the present invention, the bending resistance is, for example, more than 15 N·cm and less than 65 N·cm. In an aspect, the bending resistance is 16.5 N·cm or more and 59.5

N·cm or less. As the bending resistance is within such a range, it is possible to far effectively suppress the stress applied to the bonding portion from becoming large when the label is wound around the product, and prevent the bonding from easily coming off. Moreover, the film can have excellent appearance, for example, as a label. For example, it is possible to prevent the label from wrinkling when the label is sent out, the label can follow the unevenness of the product when wound around the product, and it is possible to prevent problems that lead to denting and distortion.

The cavity-containing polyester film may have cavities of 5 $\mu m^2$ or more, for example, cavities of 10 $\mu m^2$ or more, or cavities of 15 $\mu m^2$ or more. For example, the cavities may include cavities of 35 $\mu m^2$ or less or 30 $\mu m^2$ or less. In the present disclosure, by having such cavities, the bending resistance and the apparent density can be equipped in a well-balanced manner. As the layer A has such a cavity size, the bending resistance and the apparent density can be equipped in a well-balanced manner and a favorable OD value and a favorable color tone b value can be exhibited.

In an aspect, in a case where the cavity-containing polyester film has cavities of 5 $\mu m^2$ or more, the particle size of the polypropylene-based resin contained in the composition A containing the polyester-based resin A and the polypropylene-based resin is 1 $\mu m$ or more and 25 $\mu m$ or less, for example, 3 $\mu m$ or more and 20 $\mu m$ or less, for example, 3 $\mu m$ or more and 17 $\mu m$ or less. The particle size of the polypropylene-based resin may be, for example, a size to be 5% or more or 10% or more of the thickness of the entire film. The particle size can be confirmed, for example, in the film in an undrawn state.

Although it should not be interpreted as being limited to a specific theory, by setting cavities having the above size and the polypropylene particle size to be within the ranges of the present invention, for example, it is possible to exert the effect of unlikely undergoing wrinkling, distortion and the like in addition to the effect of exhibiting excellent concealability, whiteness, and printability and high rigidity.

In another aspect, the present invention provides a substrate for label including the cavity-containing polyester film described above. The present invention further provides a film for label including an ink close adhesion coat on at least one surface of the cavity-containing polyester film described above. The present invention also provides a roll label including a pressure sensitive adhesive layer on a part of at least one surface of the film for label.

EXAMPLES

Hereinafter, the present invention will be specifically described with reference to Examples. The present invention is not limited to Examples described below. The respective evaluation items in Examples and Comparative Examples were measured by the following methods.

(1) Limiting Viscosity [η]

The resin was dissolved in a mixed solvent of phenol/tetrachloroethane=60/40 (mass ratio), and the limiting viscosity was measured at 30° C. using an Ostwald viscometer. The measurement was performed 3 times and the average value thereof was determined.

(2) Apparent Density

The film was cut into four sheets of 5.0 cm square, the four sheets were stacked, the total thickness was measured to four effective digits at ten different locations using a micrometer, and the average value of the thicknesses of the four stacked sheets was determined. This average value was divided by 4 and rounded to three effective digits to attain the average thickness per sheet (t: $\mu m$). The mass (w: g) of four sheets of the same sample was measured using an automatic top-pan balance to four effective digits, and the apparent density was determined by the following equation. The apparent density was rounded to three effective digits.

Apparent density (g/cm$^3$)=w/(5.0×5.0×t×10$^{-4}$×4)

(3) Optical Density (OD Value)

Measurement was performed using a transmission densitometer "Model Ihac-T5" manufactured by Ihara Electronic Industries Co., Ltd., and the measured value was converted to a value in terms of 50 μm film thickness. It indicates that concealability is greater as the optical density value is higher.

(4) Color Tone b Value

The color tone b value was measured in conformity with JIS-8722 using a color-difference meter (ZE6000) manufactured by Nippon Denshoku Industries Co., Ltd. and converted to a value in terms of 50 μm film thickness. It was judged that the degree of whiteness was higher and the yellowness was weaker as the b value was smaller.

(5) Self-Weight Deflection

A sample (10) cut to 150 mm in the bending direction and 20 mm in width was prepared, and fixed with a magnet (13) so that the hanging length from the horizontal plane was 130 mm. The distance in the vertical direction between the tip of the hanging portion of the film and the fixing portion of the film at that time is defined as the self-weight deflection (see FIG. 1).

In the table, the test piece presented in the direction "width" means that the test piece was fabricated by cutting the obtained biaxially drawn film to a length of "150 mm" along the width direction perpendicular to the longitudinal direction, and cutting by "20 mm" along the longitudinal direction of the obtained biaxially drawn film.

(6) Bending Resistance

The bending resistance was calculated by the following equation, where δ denoted the self-weight deflection determined by the method described above. The average self-weight deflection of three sheets was defined as δ.

Br=WL$^4$/8 δ

Br: Bending resistance (mNcm)
W: Gravity per unit area of test piece (mN/cm$^2$)
L: Length of test piece (cm)
δ: Self-weight deflection (cm)

Using the raw materials presented in Table 1, films of the following Examples and Comparative Examples were fabricated.

(7) Evaluation of Wrinkle

The presence or absence of wrinkles generated when a film for label having 30 cm in the deflection direction and 8 cm in the direction perpendicular to the deflection direction was wound around a test piece imitating a product was visually evaluated.

Evaluation Result o: Wrinkles were not observed.
Δ: Wrinkles having significantly small size were observed at part of film.
x: Wrinkles were generated on entire surface of film.

(8) Evaluation of Adhesive Properties

For each test piece, the evaluation was performed on the bonding portion when a film for label was wound around a product.

The presence or absence of coming off when a film for label having 30 cm in the deflection direction and 8 cm in the direction perpendicular to the deflection direction was wound around a test piece imitating a product and both ends were pasted together with a margin of 2 cm was visually evaluated.

Evaluation Result

○: Coming off did not occur at bonding portion after film for label was wound around test piece imitating product.

Δ: Coming off occurred at significantly small position of bonding portion after film for label was wound around test piece imitating product.

×: Coming off occurred at bonding portion after film for label was wound around test piece imitating product.

Example 1

[Production of Titanium Oxide Master Pellet (M1)]

A mixture prepared by mixing 50% by mass of polyethylene terephthalate resin having a melt viscosity of 200 Pa·s with 50% by mass of anatase-type titanium dioxide having an average particle size of 0.3 μm (electron microscopy) was supplied into a vented twin-screw extruder and kneaded to produce titanium oxide-containing master pellets (M1).

[Fabrication of Undrawn Film]

Mixed were 74% by mass of polyethylene terephthalate resin having a melt viscosity of 200 Pa·s, 21% by mass of polypropylene resin having a melt viscosity of 500 Pa·s, and 5% by mass of the titanium oxide-containing master pellets (M1), and vacuum drying was performed to obtain a raw material for a cavity-containing polyester layer A. The polyethylene terephthalate resin is a resin containing a recycled bottle raw material. More specifically, the polyethylene terephthalate resin contained in the raw material for the layer A contains a recycled bottle raw material in an amount of 5% by mass or more with respect to the entire amount of the resin.

Meanwhile, 30% by mass of the titanium oxide-containing master pellets (M1) and 70% by mass of polyethylene terephthalate resin having a melt viscosity of 200 Pa·s were pellet-mixed, and vacuum drying was performed to obtain a raw material for an inorganic particle-containing polyester layer B. The polyethylene terephthalate resin contained in the raw material for the layer B contains a recycled bottle raw material. The amount of the recycled bottle raw material contained in 100% by mass of the solid components in the composition B was greater than the amount of the recycled bottle raw material contained in 100% by mass of the solid components in the composition A.

These raw materials were supplied into separate extruders and melted at 280° C., and the cavity-containing polyester layer A and the inorganic particle-containing polyester layer B were laminated in the order of B/A/B, joined together with a feed block so that the thickness ratio thereof was 10/80/10, and then extruded from a T-die onto a cooling drum adjusted to 30° C., thereby fabricating an undrawn film having a two-kind three-layer configuration.

[Fabrication of Cavity-Containing Polyester Film]

The undrawn film a was uniformly heated to 70° C. using heating rolls, and longitudinally drawn by 3.2 times between two pairs of nip rolls having different circumferential speeds. At this time, as an auxiliary heating device for the film, an infrared heater (rated power: 20 W/cm) equipped with a gold reflective film in the middle of the nip rolls was disposed on both surfaces of the film at a distance of 1 cm from the film surface to heat the film. The uniaxially drawn film thus obtained was guided to a tenter, heated to 140° C., and transversely drawn by 4.0 times, the width of the film was fixed, heat setting was performed at 240° C., and the film was then relaxed at 210° C. by 3% in the width direction to obtain a cavity-containing polyester film having a thickness of 75 μm (B/A/B). The evaluation results of Example 1 are presented together in Table 1. The dispersed particle size of polypropylene resin was controlled to an appropriate size. Moreover, there was a large number of cavities of 20 μm$^2$ or more, and the apparent density, OD value (concealability), color tone b value, thermal shrinkage (MD direction and TD direction), and film forming properties were all favorable. The deflection in the width direction and bending resistance were also favorable.

Example 2

A cavity-containing polyester film having a thickness of 75 μm was obtained in the same manner as in Example 1, except that the deflection direction was the longitudinal direction.

Example 3

A cavity-containing polyester film having a thickness of 50 μm was obtained in the same manner as in Example 1.

Example 4

A cavity-containing polyester film having a thickness of 100 μm was obtained in the same manner as in Example 1.

Example 5

A cavity-containing polyester film having a thickness of 75 μm was obtained in the same manner as in Example 1, except that the amount of polypropylene resin added in the undrawn film was 15% by mass.

Example 6

A cavity-containing polyester film having a thickness of 75 μm was obtained in the same manner as in Example 1, except that the amount of polypropylene resin added in the undrawn film was 30% by mass.

Example 7

A cavity-containing polyester film having a thickness of 50 μm was obtained in the same manner as in Example 1, except that the draw ratio in the longitudinal direction was 1.0 time.

Example 8

A cavity-containing polyester film having a thickness of 75 μm was obtained in the same manner as in Example 1, except that the draw ratio in the longitudinal direction was 1.0 time.

Example 9

A cavity-containing polyester film having a thickness of 75 μm was obtained in the same manner as in Example 8, except that the deflection direction was the longitudinal direction.

Example 10

A cavity-containing polyester film having a thickness of 100 μm was obtained in the same manner as in Example 8, except that the deflection direction was the longitudinal direction.

Reference Example 1

A cavity-containing polyester film was obtained in the same manner as in Example 1, except that a composition A containing 30% by mass of the recovered raw material (derived from scraps of the film) of the cavity-containing polyester film obtained in Example 1, and 44% by mass of polyethylene terephthalate having a melt viscosity of 200 Pa·s.

The color tone was slightly inferior to that of Example 1, but the other physical properties were favorable.

Comparative Example 1

A cavity-containing polyester film having a thickness of 75 μm was obtained in the same manner as in Example 1, except that the amount of polypropylene resin added in the undrawn film was 0% by mass.

Comparative Example 2

A cavity-containing polyester film having a thickness of 75 μm was fabricated in the same manner as in Example 1, except that the amount of polypropylene resin added in the undrawn film was 50% by mass, but the film was not able to be obtained because of poor film forming properties.

Comparative Example 3

A cavity-containing polyester film having a thickness of 38 μm was obtained in the same manner as in Example 1.

Comparative Example 4

A cavity-containing polyester film having a thickness of 150 μm was obtained in the same manner as in Example 1.

TABLE 1A

| | Film forming condition | | | | | |
|---|---|---|---|---|---|---|
| | Amount of PP added | Draw ratio in longitudinal direction | Draw ratio in width direction | Drawing temperature in longitudinal direction (° C.) | Preheating temperature in width direction (° C.) | Heat setting temperature (° C.) |
| Example 1 | 21 | 3.2 | 4.0 | 70 | 140 | 240 |
| Example 2 | 21 | 3.2 | 4.0 | 70 | 140 | 240 |
| Example 3 | 21 | 3.2 | 4.0 | 70 | 140 | 240 |
| Example 4 | 21 | 3.2 | 4.0 | 70 | 140 | 240 |
| Example 5 | 15 | 3.2 | 4.0 | 70 | 140 | 240 |
| Example 6 | 30 | 3.2 | 4.0 | 70 | 140 | 240 |
| Example 7 | 21 | 1.0 | 4.0 | 70 | 140 | 240 |
| Example 8 | 21 | 1.0 | 4.0 | 70 | 140 | 240 |
| Example 9 | 21 | 1.0 | 4.0 | 70 | 140 | 240 |
| Example 10 | 21 | 1.0 | 4.0 | 70 | 140 | 240 |
| Comparative Example 1 | 0 | 3.2 | 4.0 | 70 | 140 | 240 |
| Comparative Example 2 | 50 | 3.2 | 4.0 | 70 | 140 | 240 |
| Comparative Example 3 | 21 | 3.2 | 4.0 | 70 | 140 | 240 |
| Comparative Example 4 | 21 | 3.2 | 4.0 | 70 | 140 | 240 |

TABLE 1B

| | Physical properties | | | | | | | | | Evaluation result | | |
|---|---|---|---|---|---|---|---|---|---|---|---|---|
| | PP particle size (in undrawn film) (μm) | Thickness (μm) | Direction | Apparent density (g/cm³) | Elastic modulus in deflection direction (Mpa) | Amount of deflection (mm) | Bending resistance (N·cm) | OD value | Color tone b value | Film forming properties | Wrinkle resistance | Adhesive properties |
| Example 1 | 12 | 75 | Width | 1.03 | 3390 | 85 | 32 | 0.63 | 0.7 | ○ | ○ | ○ |
| Example 2 | 12 | 75 | Longitudinal | 1.03 | 2730 | 97 | 28 | 0.63 | 0.7 | ○ | ○ | ○ |
| Example 3 | 10 | 50 | Width | 1.07 | 3580 | 110 | 17 | 0.63 | 0.7 | ○ | ○ | ○ |
| Example 4 | 15 | 100 | Width | 0.99 | 3310 | 64 | 54 | 0.63 | 0.7 | ○ | ○ | ○ |
| Example 5 | 10 | 75 | Width | 1.08 | 3580 | 86 | 33 | 0.63 | 0.7 | ○ | ○ | ○ |
| Example 5 | 14 | 75 | Width | 0.98 | 3240 | 86 | 30 | 0.63 | 0.7 | ○ | ○ | ○ |
| Example 7 | 10 | 50 | Width | 0.93 | 5790 | 95 | 17 | 0.63 | 0.7 | ○ | ○ | ○ |
| Example 8 | 12 | 75 | Width | 0.92 | 5530 | 64 | 38 | 0.63 | 0.7 | ○ | ○ | ○ |
| Example 9 | 12 | 75 | Longitudinal | 0.91 | 2330 | 100 | 20 | 0.63 | 0.7 | ○ | ○ | ○ |

TABLE 1B-continued

| | Physical properties | | | | | | | | | Evaluation result | | |
|---|---|---|---|---|---|---|---|---|---|---|---|---|
| | PP particle size (in undrawn film) (μm) | Thickness (μm) | Direction | Apparent density (g/cm³) | Elastic modulus in deflection direction (Mpa) | Amount of deflection (mm) | Bending resistance (N · cm) | OD value | Color tone b value | Film forming properties | Wrinkle resistance | Adhesive properties |
| Example 10 | 12 | 100 | Longitudinal | 0.89 | 2180 | 74 | 42 | 0.63 | 0.7 | ○ | ○ | ○ |
| Comparative Example 1 | — | 75 | Width | 1.42 | 3410 | 105 | 35 | 0.35 | 0.7 | ○ | ○ | ○ |
| Comparative Example 2 | 18 | 75 | Width | — | — | — | — | 0.63 | 0.7 | x | — | — |
| Comparative Example 3 | 10 | 38 | Width | 1.10 | 3840 | 121 | 12 | 0.63 | 0.7 | ○ | x | ○ |
| Comparative Example 4 | 19 | 150 | Width | 0.95 | 3230 | 49 | 102 | 0.63 | 0.7 | ○ | ○ | x |

In Comparative Example 1, since the polypropylene-based resin according to the present invention was not contained, the apparent density was higher than in the present invention.

In Comparative Examples 2 to 4, the amounts of self-weight deflection of the films in at least one direction were all out of the range of the present invention. For this reason, problems such as poor appearance and generation of wrinkles occurred.

INDUSTRIAL APPLICABILITY

According to the present invention, it is possible to provide a cavity-containing polyester film, which exhibits excellent lightness and cushioning properties as well as favorable concealability, degree of whiteness, thermal dimensional stability, and film forming properties, even in a case of using an inexpensive polypropylene resin as a cavity creating agent.

DESCRIPTION OF REFERENCE SIGNS

10 Sample
11 Amount of self-weight deflection
12 Measuring member
13 Magnet

The invention claimed is:

1. A cavity-containing polyester film comprising a layer A containing cavities inside and a layer B disposed on both surfaces of the layer A, wherein
   the layer A is formed of a composition A containing a polyester-based resin A and a polypropylene-based resin,
   the layer B is formed of a composition B containing inorganic particles and a polyester-based resin B,
   both of the polyester-based resin A and the polyester-based resin B contain a recycled bottle raw material, an amount of the recycled bottle raw material contained in the composition B is larger than an amount of the recycled bottle raw material contained in the composition A,
   a thickness of the cavity-containing polyester film is 75 μm or more and 300 μm or less,
   an amount of self-weight deflection of the film in at least one direction is 60 mm or more and 97 mm or less, and
   wherein an elastic modulus of the film in the deflection direction is 2500 MPa or more and 7500 MPa or less.

2. The cavity-containing polyester film according to claim 1, wherein the composition A contains a recycled raw material of a cavity-containing polyester film at 5% to 60% by weight.

3. The cavity-containing polyester film according to claim 1, wherein the inorganic particles in the composition B are titanium oxide.

4. The cavity-containing polyester film according to claim 1, which has an optical density of 0.55 or more in terms of 50 μm thickness and a color tone b value of 4 or less.

5. The cavity-containing polyester film according to claim 1, which has an apparent density of 0.8 g/cm³ or more and 1.3 g/cm³ or less.

6. A substrate for label comprising the cavity-containing polyester film according to claim 1.

7. A film for label comprising an ink close adhesion coat on at least one surface of the film according to claim 1.

8. A roll label comprising a pressure sensitive adhesive layer on a part of at least one surface of the film for label according to claim 7.

9. The cavity-containing polyester film according to claim 1, wherein a bending resistance is, more than 15 N·cm and less than 65 N·cm.

* * * * *